United States Patent [19]

Tramposch

[11] Patent Number: 4,561,512

[45] Date of Patent: Dec. 31, 1985

[54] LOAD CELL SCALE OF UNITIZED CONSTRUCTION

[75] Inventor: Herbert Tramposch, Riverside, Conn.

[73] Assignee: Pitney Bowes Inc., Stamford, Conn.

[21] Appl. No.: 613,994

[22] Filed: May 25, 1984

[51] Int. Cl.[4] .......................... G01G 3/08; G01G 3/14
[52] U.S. Cl. ...................................... 177/229; 177/211
[58] Field of Search ................................ 177/211, 229

[56] References Cited

U.S. PATENT DOCUMENTS 4,170,270  10/1979  Sette et al. ................... 177/229 X
4,485,881  12/1984  Tramposch et al. ........... 177/229 X
4,505,345   3/1985  Jetter ............................ 177/211

FOREIGN PATENT DOCUMENTS 2431689  3/1980  France .......................... 177/229

*Primary Examiner*—E. A. Goldberg
*Assistant Examiner*—Patrick W. Foster
*Attorney, Agent, or Firm*—Peter Vrahotes; William D. Soltow, Jr.; Albert W. Scribner

[57] ABSTRACT

A unitary load cell having an assembled connector that provides connection between the load beam of the load cell and the sensing beam. The structure allows ease of fabrication as well as subjecting the load cell to a compressive force as opposed to subjecting it to tension.

7 Claims, 4 Drawing Figures

LOAD CELL SCALE OF UNITIZED CONSTRUCTION

BACKGROUND OF THE INVENTION

Load cells are being used more frequently because of the high accuracy one is able to obtain with such a device. In a load cell, strain gages are used to determine a load by measuring compression created in a portion of the strain gages and tension created in the balance of the strain gages as a result of the load being applied to the load cell. In single point load cell scales, the strain gages are located on opposite sides of the transfer point with those on one side being under compression and those on the other side being under tension when a load is applied. In prior load cells relatively large units were assembled and a load was transferred through a ball bearing under compression as disclosed in U.S. Pat. Nos. 4,037,675 and 4,170,270.

Recently, load cell scales of a unitary, or monolithic, construction have been proposed wherein the entire assembly is made of one piece. Such a load cell is shown and described in U.S. Pat. No. 4,181,011. The connector between the load beam and sensing beam is integral with these two beams and is machined in order to achieve the proper configuration. With this construction, the load beam is located below the sensing beam and when a load is to be determined, the load is transferred through the connector under tension. The advantage of such a structure is that one need not be concerned with connector buckling problems. The connecting member between the load beam and sensing beam is generally relatively long and narrow because it must flex. This can raise problems relative to buckling of the connector if the load is transferred in such a way as to place the connector under compression. The shortcoming of such prior structures is that they are expensive to produce, requiring accurate, time-consuming machining. In addition, the connectors of prior art devices of unitary construction, whose connectors are under tension when a load is placed thereon, have certain structural strength problems. As is well known, materials have less tensile strength than compressive strength so that in cases of overload or shock the connector in the prior structure could rupture.

SUMMARY OF THE INVENTION

A load cell has been conceived that has an externally fabricated flex link which may be inserted into the load cell to connect the load beam with the sensing beam. The flex link is machined to the proper configuration separately from the balance of the unitary load cell, and is then inserted between the load beam and sensing beam. With this structure, the components of the load cell are placed under compression during the measurement of a load while providing the flexure required.

DETAILED DESCRIPTION OF THE PREFERRED EMBODIMENTS

Figure 1:
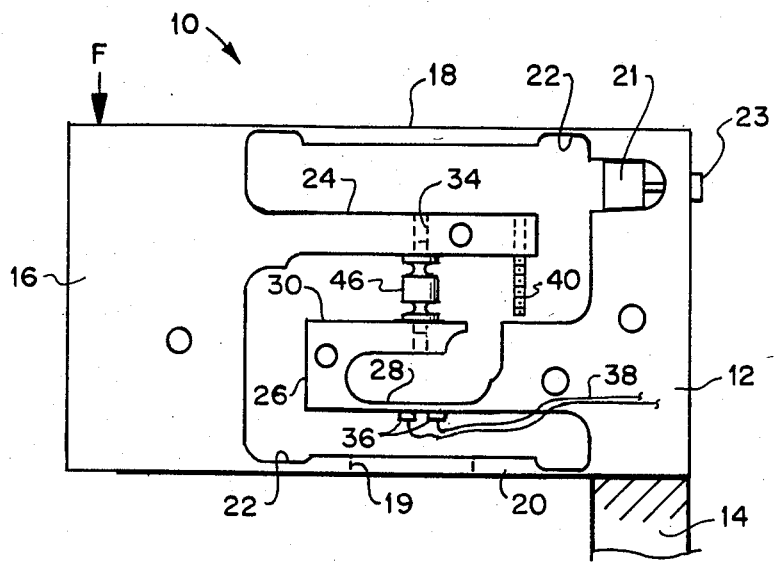
FIG. 1 shows a cross sectional view of a load cell that utilizes the instant invention.
Figure 2:
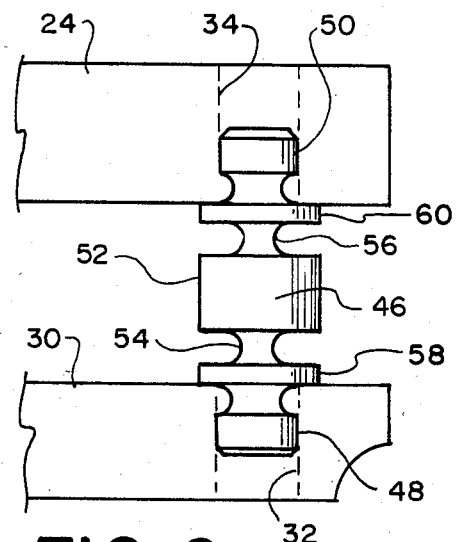
FIG. 2 is an enlarged view of a section of the load cell shown in FIG. 1 showing the flexure connector in greater detail.

Referring now to FIGS. 1 and 2, a load cell is shown generally at 10 and includes a fixed member 12 that is supported by a base 14 and a movable member 16 that will move in response to a force F applied thereto as shown in FIG. 1. A pair of longitudinally extending connecting links 18 and 20 are integral with the fixed member 12 and the movable member 16 to form an integral parallelogram. Each of the connecting links 18, 20 has a pair of laterally extending joints 22 therein that provides greater flexibility. Located within the space defined by the connecting link 18 and fixed member 12 is a wedge 21 having a bolt 23 connected thereto so as to provide means for adjusting the location where a force F is applied as is known in the art.

A load beam 24 extends from the movable member 16 and a sensing beam 26 extends from the fixed member 12, the sensing beam 26 being of a generally C-shaped configuration and having a lower load sensing portion 28 and an upper portion 30 that has an opening 32 therein. The opening 32 of the upper portion 30 is axially aligned with an opening 34 in the load beam 24. Four strain gages 36 (only two being shown) are secured to the load sensing portion 28 and have leads 38 extending therefrom.

A set screw 40 is received within the load beam 24 and extends to within a short distance of the sensing beam 26. This set screw 40 acts as a overload preventor to protect the strain gages 36 as is well known in the art.

A flex connector 46 has a stub 48, 50 at each opposite end thereof, one stub 48 being received within the opening 32 of the upper portion 30 and the other stub 50 being received within the opening 34 of the load beam 24. The balance of the flex link 46 is generally cylindrically shaped with a central portion 52 and reduced diameter portions 54, 56 on opposite sides of the central portion. Intermediate the reduced portions 54, 56, and the stubs 48, 50 are flanges 58, 60, respectively, each having a diameter greater than the respective openings 32, 34.

The flex connector of the preferred embodiment had a central portion 52 with a diameter of $\frac{1}{4}''$ and a length of 0.17". The reduced portion 54, 56 had diameters of 0.04". The flanges 58, 60 each had a diameter $\frac{1}{4}''$ and a length 1/16". The distance between the bottom of the load beam 24 and the upper portion was $\frac{3}{8}''$. Finally, the openings 32, 34 had a diameter of $\frac{1}{8}''$.

As will be appreciated, the flexure connector 46 will be machined before it is installed to the load cell 10. For example, it may be machined from a single aluminum alloy rod of an appropriate diameter. This is obviously advantageous as opposed to taking a load cell of unitary construction that has a generally rectangular configuration and attempting to machine a flexure connector 46 as a part thereof. After the flexure connector 46 is machined, it may be inserted within the load cell 10 by separating the load beam 24 and sensing beam 26 sufficiently to place the stubs 48, 50 into their respective openings 32, 34. With release of the load beam 24 and sensing beam 26, the flex link 46 will be secured as a result of pressure thereon. If desired, an adhesive may be used to secure the flexure connector 46.

As can be seen from FIG. 1, when a force F is applied upon the movable member 16, the load is transmitted through the load beam 24 and the flexure connector 46 to the sensing beam 26. All these components will be under compression during the measurement of the force F. This is advantageous over other unitary load cells which had their components under tension.

Although the flexure connector 46 is shown in FIGS. 1 and 2 having a central portion 52 and reduced diameter portions 54, 56, this configuration basically is for machining convenience. The reduced diameter portions 54, 56 provide the flexing required for proper functioning of the load cell 10. This particular configuration is dictated by machine convenience considerations as the flex link 46 may be a rod having a single diameter. The selection of the diameter in the case of a rod with a uniform cross section, or the reduced diameters 54, 56, is dictated by the formula:

$$L/A < S$$

Where L = the maximum load to be applied
A = the cross sectional area, and
S = the yield point.

The diameter of the flex link 46 with a uniform cross section will be such that the diameter is sufficiently large so that the load to area ratio is slightly less than the yield point. As an example, in using an aluminum rod with a yield stress of 50,000 lbs./in$^2$, the diameter should be approximately 1/32". A diameter of 1/32" has a cross sectional area of approximately $7.7 \times 10^{-4}$ in$^2$ which is much greater than $1 \times 10^{-4}$ required according to the formula for a maximum load of five pounds. The maximum length of the flex link is given by the critical slenderness ratio for columns in accordance with the formula:

$$l/r < 120$$

Where l = length of the flex link
r = radius of gyration

In the preferred embodiment, the length of the flex link was $\frac{5}{8}$". Using the above formula:

$$l/r = 0.625/1/128 = 80$$

Since this is less than 120, the length is within the limits required for a short beam and buckling is not a factor.

Figure 3:
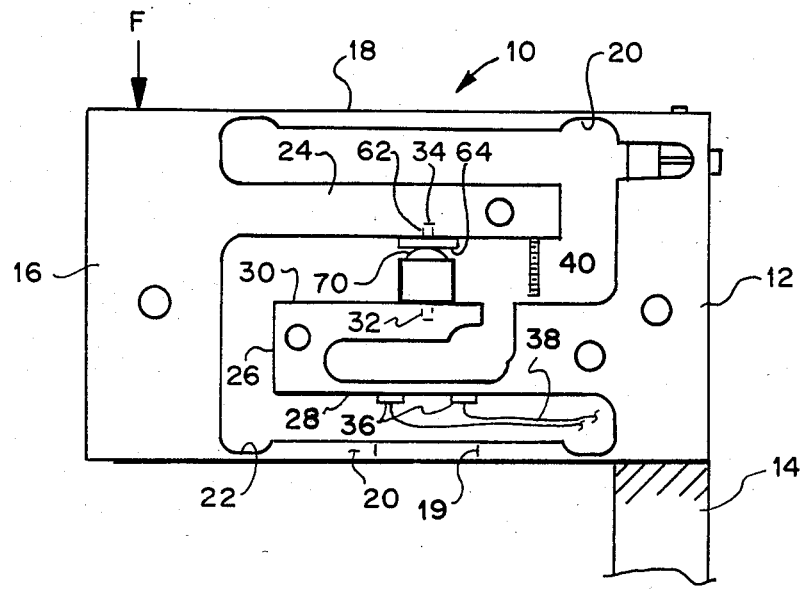
FIG. 3 is a diagramatic representation of a view similar to FIG. 1 showing an alternative embodiment.
Figure 4:
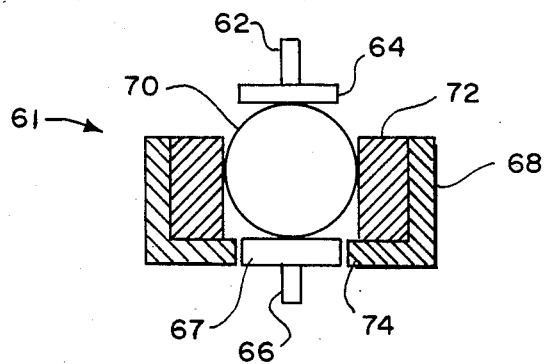
FIG. 4 is an enlarged view of a section of the load cell shown in FIG. 3 showing the connector in greater detail.

Referring to FIGS. 3 and 4, an alternate embodiment of the instant invention will be described wherein the same reference numbers will be used to refer to like components. A load cell is shown generally at 10 constituted in the same manner as the load cell previously described with the exception that the flexure connector 46 is replaced with a ball bearing connector assembly shown generally at 61. A pin 62 is received within the opening 34 and has a pad 64 integral therewith. The pin 62 may be force fit into the opening 34 or it may be secured to the load beam 24 by an adhesive. The pad 64 will be made of a material such as hardened steel. The sensing beam 26 receives within its opening 32 another pin 66 that is integral with a pad 67. A cup 68 is disposed upon the sensing beam 26 and within the cup is a ball bearing 70 that is received within an annular foam member, 72. Again, the pin 66 may be force fit into the opening 32 or it may be secured by an adhesive. The cup 68 has an opening 74 that receives the pad 67. The connecting assembly 60 may be assembled by placing the ball bearing 70 within the foam rubber 72 of the cup 68. The load beam 24 and sensing beam 26 will be separated and the cup 68 with contents will be located between the pads 64, 67 with the lower pad 67 being received within the opening 74. The load and sensing beams 24, 26, respectively, would be released and the load cell would be in condition for operation.

The construction of the second embodiment provides a single point contact load cell of basically unitary construction. It avoids the massive structure of prior single point contact load cells that used ball bearings while overcoming the previously described shortcomings of prior unitized load cells.

What is claimed is:

1. A unitized load cell comprising:
   a vertically extending fixed support member,
   a vertically extending movable support member horizontally spaced relative to said fixed support member,
   a pair of links each of which is integral with said fixed support member and said movable support member to form a parallelogram,
   a load beam extending from said movable support member,
   a sensing beam extending from said fixed support member and located vertically below said load beam,
   an opening in said sensing beam,
   an opening located in said load beam, and
   a cylindrical flexure connector having a first portion of one end received within the opening of said load beam and a second portion of said one end abutting said load beam and the other end having a first portion received within said opening of said sensing beam and a second portion abutting said sensing beam,
   whereby a load may be transferred from said load beam to said sensing beam by placing said cylindrical flexure connector under compression.

2. The load cell of claim 1 wherein the cross sectional area of said flexure connector is greater than the ratio of the yield point of said flexure connector to the length of the flexure connector located between said load beam and said sensing beam.

3. The load cell of claim 2 wherein the length of said flexure connector is less than the product of the radius of gyration multiplied by 120.

4. A unitized load cell comprising:
   a vertically extending fixed support member,
   a vertically extending movable support member horizontally spaced relative to said fixed support member,
   a pair of links each of which is integral with said fixed support member and said movable support member to form a parallelogram,
   a load beam extending from said movable support member,
   a sensing beam extending from said fixed support member and located vertically below said load beam,
   an opening in said sensing beam,
   an opening located in said load beam, and
   a cylindrical flexure connector having a central cylindrical portion, first and second reduced cylindrical portions on opposite sides of said central portion, said reduced cylindrical members having diameters less than the diameter of said central cylindrical member, stubs attached to said reduced diameter cylindrical members and being coaxial therewith, one of said stubs being received within the opening of said load beam and the other of said stubs being received in said opening of said sensing beam, whereby a load may be transferred from said load beam to said sensing beam by placing said cylindrical connector under compression.

5. The load cell of claim 4 wherein the cross sectional areas of said reduced diameters are greater than the ratio of the yield point of the flexure connector to the length of the flexure connector located between said load beam and said sensing beam.

6. The load cell of claim 5 wherein the length of the flexure connector is less than the product of the radius of gyration multiplied by 120.

7. A unitized load cell comprising:
a vertically extending fixed support member,
a vertically extending movable support member horizontally spaced relative to said fixed support member,
a pair of links each of which is integral with said fixed support member and said movable support member to form a parallelogram,
a load beam extending from said fixed support member and having an opening therein,
a sensing beam extending from said fixed support member and located below said load beam,
said sensing beam having an opening therein,
a sphere located between and in engagement with said load beam and said sensing beam, and
means for securing said sphere between said load beam and said sensing beam, comprising a cup having an opening in the base thereof, an annular foam member received within said cup, a first pad having a pin extending therefrom, said pin being received within said opening of said sensing beam, said base of said cup being disposed upon by said sensing with said pad received within said cup opening and a second pad having a pin extending therefrom, said pin of said second pad being received within said opening of said load beam, said sphere being received within said annular foam member and in engagement with said first and second pads.
whereby a load may be transferred from said load beam to said sensing beam by placing said sphere under compression.

* * * * *